United States Patent
Richard et al.

(10) Patent No.: US 9,471,115 B2
(45) Date of Patent: Oct. 18, 2016

(54) PROCESSOR CARD HOUSING WITH FAN

(75) Inventors: Owen Richard, Fort Collins, CO (US); Jonathan D Bassett, Fort Collins, CO (US); David Quijano, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 188 days.

(21) Appl. No.: 14/375,804

(22) PCT Filed: Feb. 13, 2012

(86) PCT No.: PCT/US2012/024924
§ 371 (c)(1),
(2), (4) Date: Jul. 31, 2014

(87) PCT Pub. No.: WO2013/122570
PCT Pub. Date: Aug. 22, 2013

(65) Prior Publication Data
US 2014/0376170 A1  Dec. 25, 2014

(51) Int. Cl.
*G06F 1/20* (2006.01)
*G06F 1/18* (2006.01)

(52) U.S. Cl.
CPC .............. *G06F 1/20* (2013.01); *G06F 1/186* (2013.01); *G06F 1/203* (2013.01)

(58) Field of Classification Search
CPC .......... G06F 1/20; G06F 1/185; G06F 1/203; G06F 1/206; H05K 7/20736; H05K 7/20145; H05K 7/20172; H05K 7/20727; H05K 5/0213; H05K 7/1417; H05K 7/20136; H05K 7/20154; H05K 7/20754; H05K 7/20809

USPC ......... 361/695, 679.48, 697, 679.47, 679.54, 361/709, 720, 760, 679.31, 679.33, 679.46, 361/690, 696, 704, 707, 715, 719, 725, 727, 361/737; 165/104.33, 80.2
See application file for complete search history.

(56) References Cited

U.S. PATENT DOCUMENTS

| | | | |
|---|---|---|---|
| 5,338,214 A * | 8/1994 | Steffes ................... | G06F 1/184 361/679.32 |
| 5,544,006 A * | 8/1996 | Radloff .................. | G06F 1/184 174/138 G |
| 5,838,542 A | 11/1998 | Nelson et al. | |
| 5,856,910 A | 1/1999 | Yurchenco et al. | |
| 6,772,246 B2 | 8/2004 | Kim et al. | |
| 7,190,586 B2 | 3/2007 | Franz et al. | |
| 7,242,576 B2 | 7/2007 | Coster et al. | |
| 7,312,999 B1 | 12/2007 | Miyamura et al. | |
| 7,382,621 B2 * | 6/2008 | Peng ..................... | H01L 23/427 165/121 |
| 7,649,743 B2 | 1/2010 | Ni et al. | |

(Continued)

FOREIGN PATENT DOCUMENTS

DE    19823285 A1    12/1999

OTHER PUBLICATIONS 2.5" SATA HDD Tray Less Mobile Rack for PCI Slot, 2010, 1 page, Sybausa, Available at: <sybausa.com/productInfo.php?iid=938>.

(Continued)

*Primary Examiner* — Courtney Smith
*Assistant Examiner* — Michael Matey
(74) *Attorney, Agent, or Firm* — HP Inc. Patent Department

(57) ABSTRACT

A device can include a housing, a fan, and a heat sink. The heat sink can dissipate heat from a processor card. The device can be installed into a chassis of a computer.

15 Claims, 9 Drawing Sheets

(56) References Cited

U.S. PATENT DOCUMENTS

| | | | |
|---|---|---|---|
| 7,710,741 B1* | 5/2010 | Kelleher | G06F 1/185 361/760 |
| 2001/0024357 A1 | 9/2001 | Behl | |
| 2002/0044424 A1* | 4/2002 | Hashimoto | H01L 21/4878 361/709 |
| 2003/0016496 A1* | 1/2003 | Kim | G06F 1/184 361/695 |
| 2003/0168202 A1 | 9/2003 | Chang et al. | |
| 2003/0198016 A1* | 10/2003 | Wobig | G06F 1/20 361/679.47 |
| 2005/0061477 A1* | 3/2005 | Mira | F04D 29/582 165/80.3 |
| 2007/0047211 A1* | 3/2007 | Refai-Ahmed | H01L 23/4093 361/720 |
| 2007/0133178 A1* | 6/2007 | Han | G06F 1/20 361/719 |
| 2007/0280818 A1* | 12/2007 | Yang | F04D 29/161 415/102 |
| 2011/0279969 A1* | 11/2011 | Memon | G06F 1/20 361/679.47 |
| 2011/0289251 A1 | 11/2011 | Hung et al. | |
| 2012/0087088 A1* | 4/2012 | Killion | F28D 15/0266 361/697 |
| 2012/0268890 A1* | 10/2012 | Stock | G06F 1/20 361/679.53 |

OTHER PUBLICATIONS

International Search Report and Written Opinion, International Application No. PCT/US2012/024924, Date of Mailing: Oct. 12, 2012, pp. 1-7.

Mac Pro, Designed to be custom designed, 2013, 1 page, Apple Inc.

European Search Report, Sep. 10, 2015, EP Patent Application No. 12868460.2, pp. 1-7.

* cited by examiner

PROCESSOR CARD HOUSING WITH FAN

BACKGROUND

Computing devices, such as desktop computers, workstation computers, and laptops, can be upgraded by changing components. For example, processor cards such as graphics processing cards can be added to a computing device, or an existing one can be changed. However, many components can be difficult to install, which can cause user frustration and sometimes may cause a user to choose not to upgrade his computing device. In addition, some manufacturers limit the selection of components that can be preconfigured in a user's computing device, which also can be frustrating for users. This can result in user dissatisfaction.

BRIEF DESCRIPTION OF DRAWINGS

The following detailed description refers to the drawings, wherein.

DETAILED DESCRIPTION

Manufacturers of computing devices are challenged with creating computing devices that are configurable and accessible to users. For example, some users desire to upgrade their computing devices by adding or replacing certain components, such as processor cards.

According to an embodiment, a device can include a housing, a heat sink inside the housing, and a fan inside the housing to disperse heat from the heat sink. A processor card, such as a Mobile PCI Express Module (MXM) graphics processing card, can be held against the heat sink by a back plate. The housing can be configured to install into a chassis of a computer such that an edge of the processor card mates with a connector on a circuit board of a computer. One benefit of this configuration may be simplification of installation. For instance, separate installation of the processor card and fan into the computer chassis may be avoided since the device can include both components.

Furthermore, the device can include a blind mate connector to automatically connect the fan to a power source of the computer upon installation of the housing into the chassis. The chassis may also include a blind mate connector to connect with the device's blind mate connector. The blind mate connector can provide a connection between the fan and the computer's circuit board, allowing the circuit board to control the fan. Thus, a user may avoid having to separately connect the fan to the circuit board of the computer, which can be difficult and frustrating.

In addition, the device can include a latch to connect the housing to the chassis. The latch can facilitate tool-free installation of the housing to the computer chassis. In one example, the housing can be installed into the chassis via a hinging motion. This can be beneficial since some processor cards, such as MXM graphics cards, may also be connected to a connector on a computer's circuit board via a hinging motion. Thus, the device can be installed into the chassis in a tool-free manner, resulting in both the housing being secured into the chassis and the processor card being connected to the circuit board connector.

Further details of these embodiments and associated advantages, as well as of other embodiments and applications, will be discussed in more detail below with reference to the drawings.

Figure 1A:
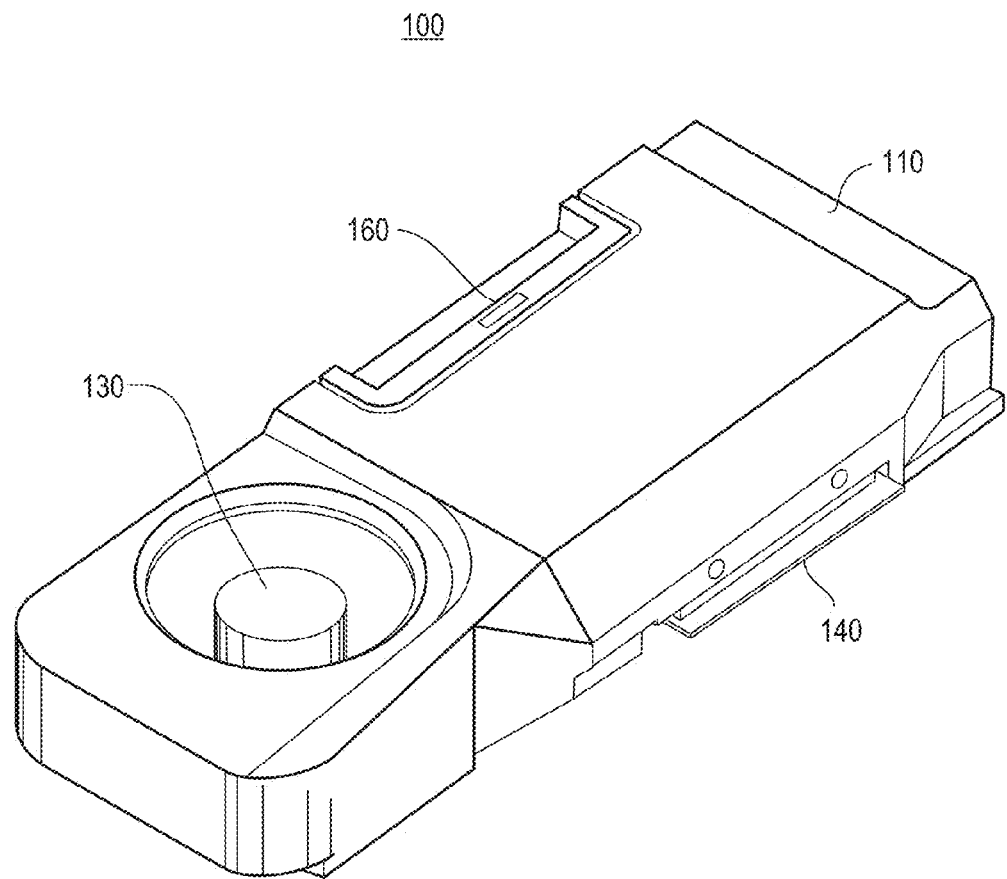
FIGS. 1A-1C depict different views of a device that can be used to house and install a processor card, according to an example.
Figure 1B:
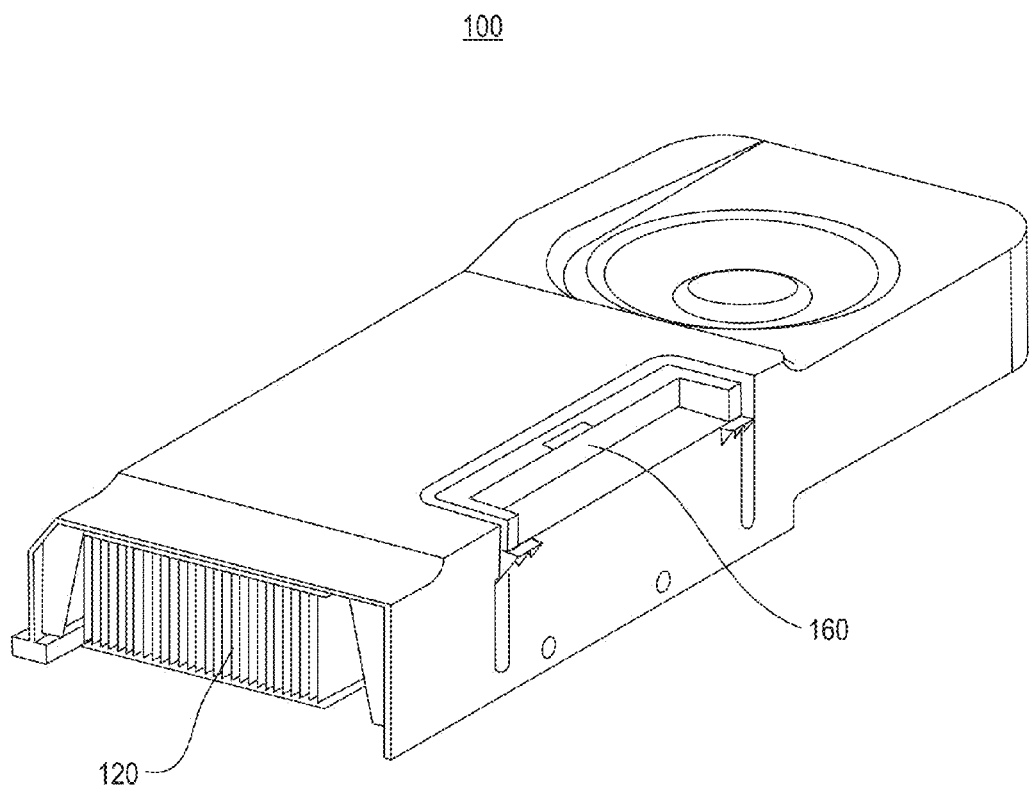
Figure 1C:
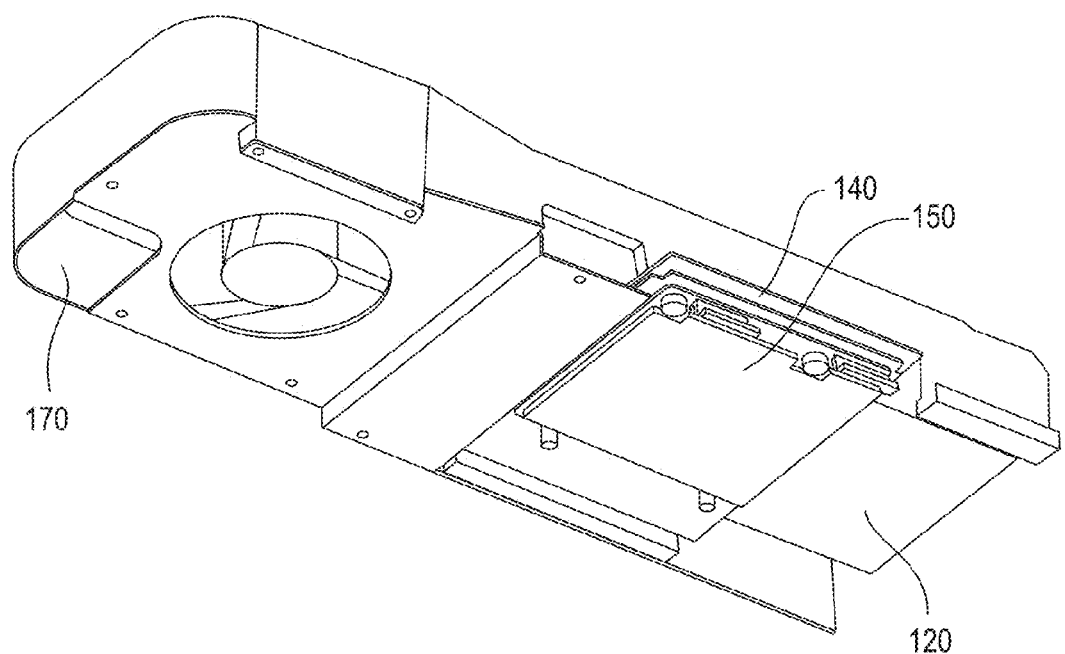

Referring now to the drawings, FIGS. 1A-1C depict different views of a device 100, according to an example. Device 100, which can also be referred to as an assembly, can be used to house a processor card and install it into a computing device. The computing device can be any of various devices, such as a workstation computer, a desktop computer, an All-In-One computer, a laptop computer, or the like. The computing device can have a chassis to house various components.

Device 100 can include a housing 110. Housing 110 may have an elongated shape and may be made of various materials, such as polymers and metals. By constructing housing 110 of a thermally nonconductive material, heat can be more easily managed using other components of device 100. In particular, device 100 may have a thermal cooling arrangement for dissipating heat. For example, device 100 may have a heat sink and fan.

Device 100 may include a heat sink 120. Heat sink 120 may be housed in one end of housing 100. The heat sink may be made of various materials. For example, the heat sink may be made of one or more thermally conductive materials such as a metal. Device 100 may also include a fan 130. Fan 130 may be housed on the opposite end of housing 110. Fan 130 may be any of various fans. For example, fan 130 may be a centrifugal fan or other type of blower. Fan 130 may blow air across heat sink 120 to disperse heat. Although a blower-type fan is depicted in FIGS. 1A-1C, fan 130 may be a non-blower type fan. In such a case, the orientation of fan 130 may be changed so that air is directed toward heat sink 120.

The heat sink can dissipate heat from a processor card 140. In one example, processor card 140 may be held against heat sink 120 using a back plate 150. Processor card 140 may be held against heat sink 120 in other ways as well. For example, screws or other fasteners could secure processor card 140 to heat sink 120 without a back plate. Additionally, housing 110 could have a bottom portion that could assist in holding processor card 140 against heat sink 120.

A connection edge/portion of processor card 140 may protrude from housing 110 when the processor card is secured to the heat sink 120. The connection edge/portion may then be connected to a connector on a circuit board of a computer to install processor card 140 into the computer during installation of device 110 into the computer's chassis. The connection edge/portion may be any of various types of connections, and may depend on the type of the processor card. For example, the connection edge/portion may be a Peripheral Component Interconnect (PCI) Express connection, such as for a MXM graphics processing card.

Processor card 140 may be any of various processor cards. For example, processor card 140 may be a graphics processing card such as an MXM card. However, device 100 may be used to accommodate various card components that would benefit from a cooling system. Thus, processor card 140 may be another type of PCI Express card for other computing components. In some examples, processor card 140 may be a memory card.

Device 100 may include a latch 160. Latch 160 may connect housing 110 to a chassis of a computer. Thus, latch 160 may facilitate installation of device 100 into a computer. The installation may be tool-free, meaning that tools may not be needed to install device 100 into the computer chassis. Device 100 may also include a blind mate connector (shown in FIGS. 2A-2B) in cavity 170 of housing 110. The blind mate connector can automatically connect fan 130 to a power source of the computer upon installation of housing 110 into the chassis. The fan may be configured to be controlled by a circuit board of the computer via the blind mate connector.

Figure 2A:
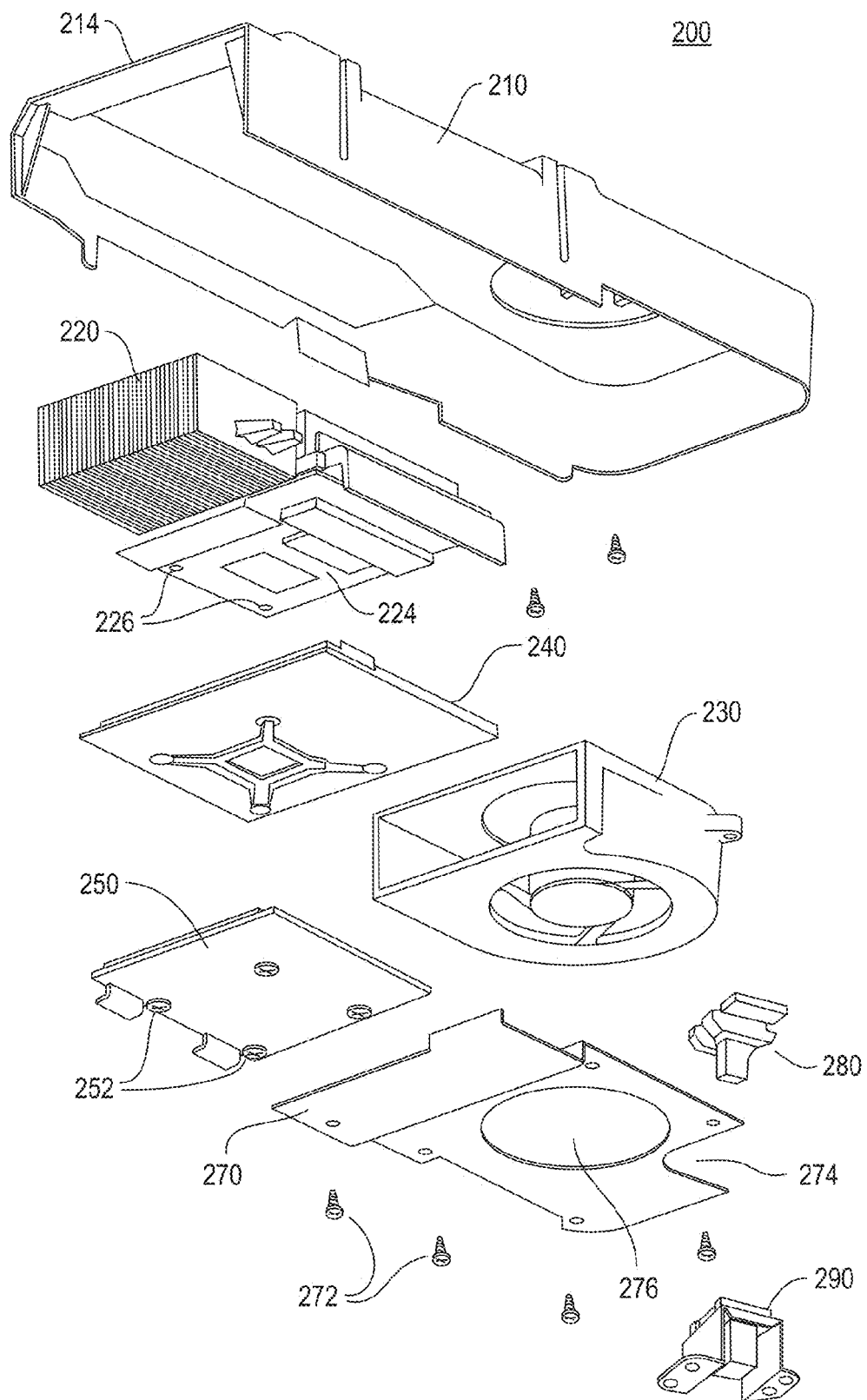
FIGS. 2A and 2B show various components of a device that can be used to house and install a processor card, according to an example.
Figure 2B:
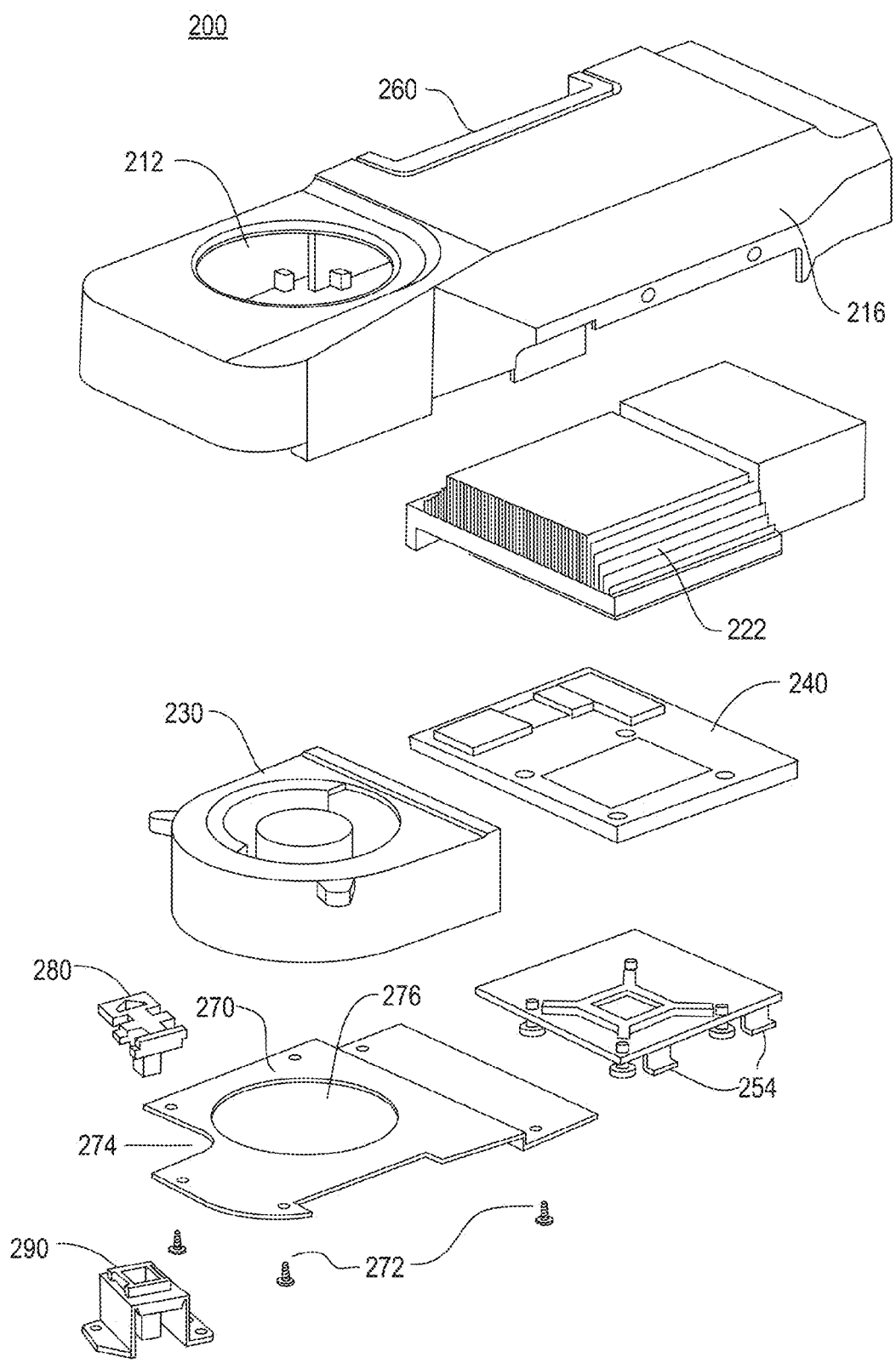

FIGS. 2A and 2B show various components of device 200, according to an example. The illustrated components may be the same as corresponding components in device 100.

Housing 210 can have an elongated shape with an open bottom. Housing 210 can include an opening 212, such as an orifice, aperture, hole, gap, slot, or the like. Opening 212 may accommodate fan 230, allowing fan 230 to suck air through opening 212. Housing 210 also may include a latch 260. Latch 260 may be operable by a user to latch housing 210 into a computer chassis for installation of device 200. Housing 210 may have a cavity within the housing to accommodate the various components of device 200. An end 214 of housing 210 may be open to allow air from fan 230 to pass out of the housing. Edge 216 of housing 210 may be slanted to facilitate installation of device 200 into a computer chassis, as explained later with reference to FIGS. 3A and 3B.

Heat sink 220 may fit inside housing 210. Heat sink 220 may dissipate heat generated by processor card 240 during operation. Heat sink 220 may be attached to housing 210 by way of various attachment devices. For example, heat sink 220 may include protruding edges, tabs, lips, or the like that may engage with corresponding features of housing 210 to retain heat sink 220 within housing 210. Heat sink 220 may also be attached to housing 210 using screws or other connectors. Heat sink 220 may include multiple elongated projections or the like with space between the projections to allow air from fan 230 to pass through, thus facilitating the efficient dispersion of heat. Additionally, heat sink 220 may have a slanted portion 222 to accommodate edge 216 of housing 210. Other types of heat sinks may be used as well.

Processor card 240 can be attached to heat sink 220. Heat sink 220 may have a receiving area 224 with posts 226 to receive processor card 240. Processor card 240 may include openings, indentations, or the like to mate with posts 226. Processor card 240 may be held against or attached to heat sink 220 using back plate 250. Back plate 250 can provide structural support to the processor card 240 and heat sink 220 and can facilitate a more secure, rigid connection to a computer chassis. Back plate 250 can be made of various materials, such as metals. In some examples, back plate 250 can have heat dissipating capabilities for dissipating heat from the back of processor card 240. Air from fan 230 can pass over back plate 250 to disperse heat away from back plate 250.

Back plate 250 may hold processor card 240 against heat sink 220 using screws 252. If processor card 240 is an MXM graphics processing card, screws 252 may fit into preconfigured openings in the processing card. This can be beneficial because an MXM graphics processing card may accordingly be obtained from a third-party supplier and installed into device 200 without any modification to the MXM graphics processing card. Back plate 250 may also include blind mate hooks 254 to automatically mate with corresponding openings, indentations, or the like in a computer chassis. The mating can occur during installation of device 200 into the chassis. Additional mating features for providing a more secure connection between the processor card, the back plate, and a computer chassis will be described below with reference to FIG. 5.

Fan 230 may fit into a portion of housing 210's cavity below opening 212. Fan 230 may be attached to housing 210 in similar ways as heat sink 220 may be attached to housing 210. Additionally, a plate or housing component 270 may further assist in holding fan 230 within housing 210. Screws 272 may attach plate/housing component 270 to housing 210.

Figure 5:
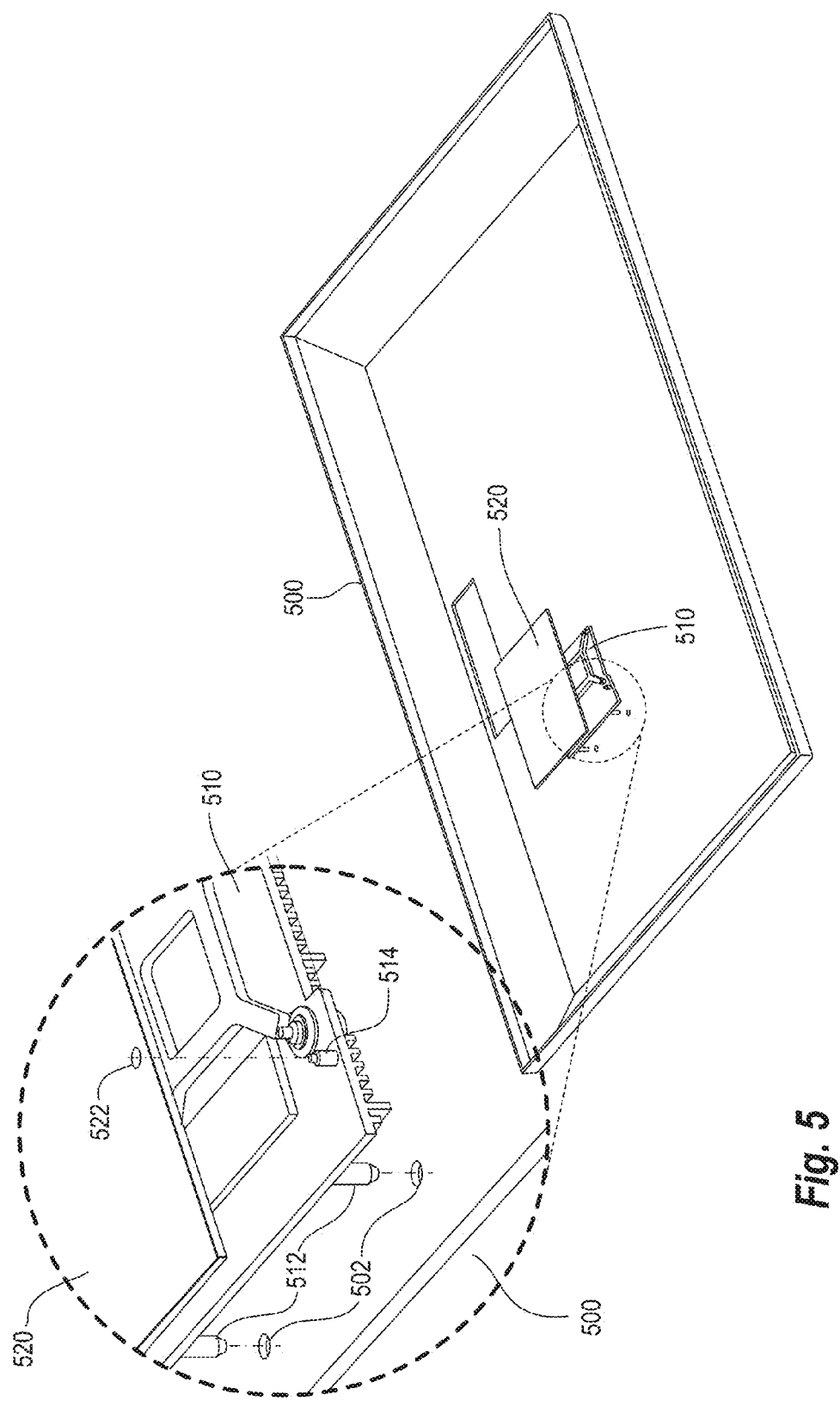
FIG. 5 depicts various attachment features of the device and the corresponding chassis, according to an example.

Plate/housing component 270 may include an opening 274 to accommodate blind mate connector 280. Blind mate connector 280 may provide a power and control connection to fan 230. Blind mate connector 280 may mate with a blind mate connector 290 of a computer chassis. (Although blind mate connector 290 may not be part of device 200, it is shown here to illustrate how the blind mate connector 280 may work. FIG. 5 illustrates how a computer chassis can include blind mate connector 290.) Blind mate connector 290 may provide a connection to a circuit board of the computer in which device 200 is installed. Accordingly, the circuit board may control fan 230, such as through pulse width modulation (PWM). Since blind mate connector 280 can automatically connect to blind mate connector 290 upon installation of device 200 into a computer chassis, the installer does not have to worry about separately installing and connecting fan 230 to the computer's circuit board.

As depicted in FIGS. 2A-2B, fan 230 may be a blower. The blower may suck air from both above the housing via opening 212 and below the housing via opening 276. Fan 230 may direct air toward heat sink 220 to dissipate heat generated by processor card 240 during operation. The air may exit out opening 214 of housing 210. Accordingly, device 200 provides an easily installable assembly for a processor card that includes its own cooling solution.

Figure 3A:
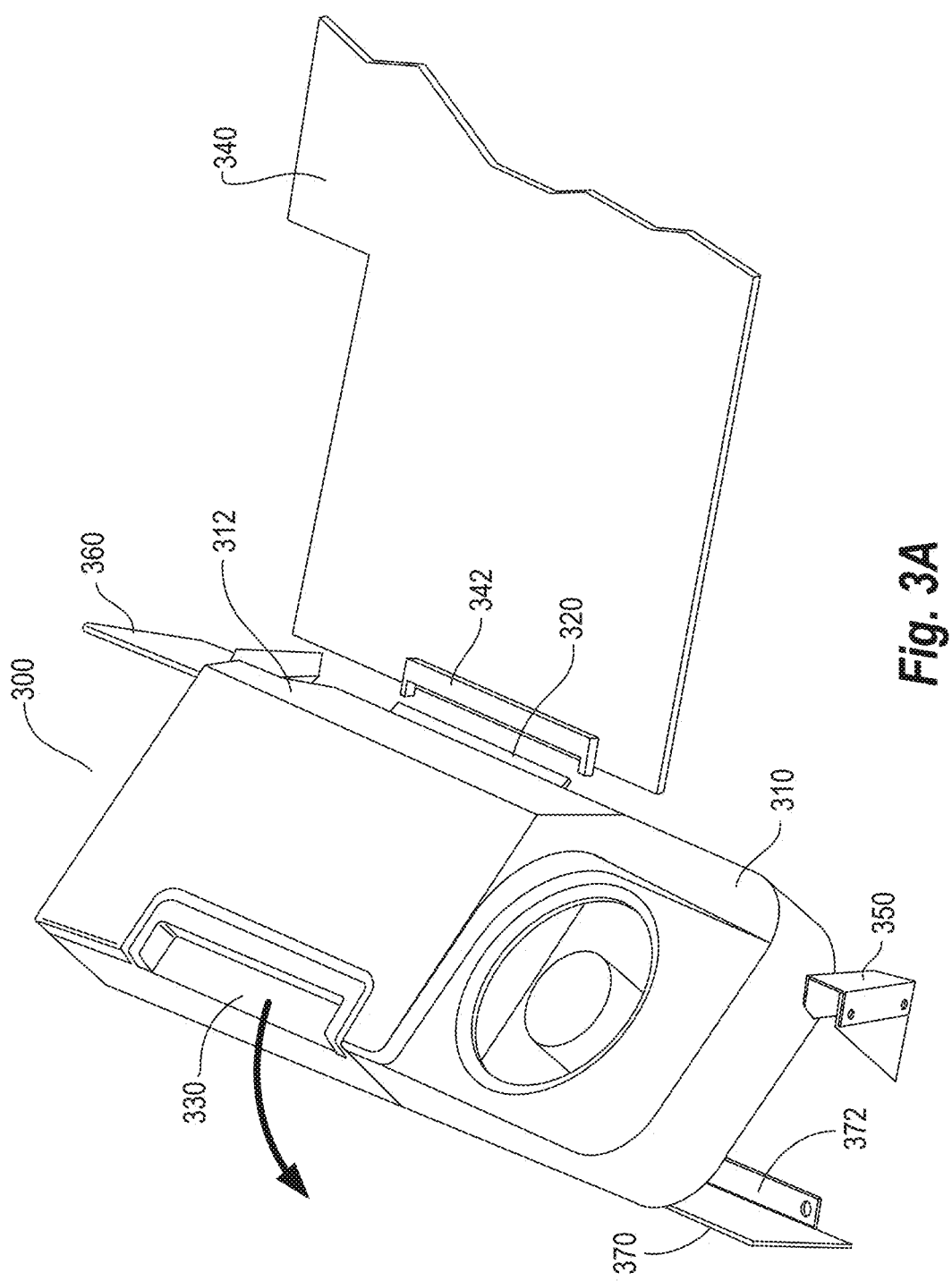
FIGS. 3A and 3B depict how a device according to FIGS. 1A-2B can be installed, according to an example.
Figure 3B:
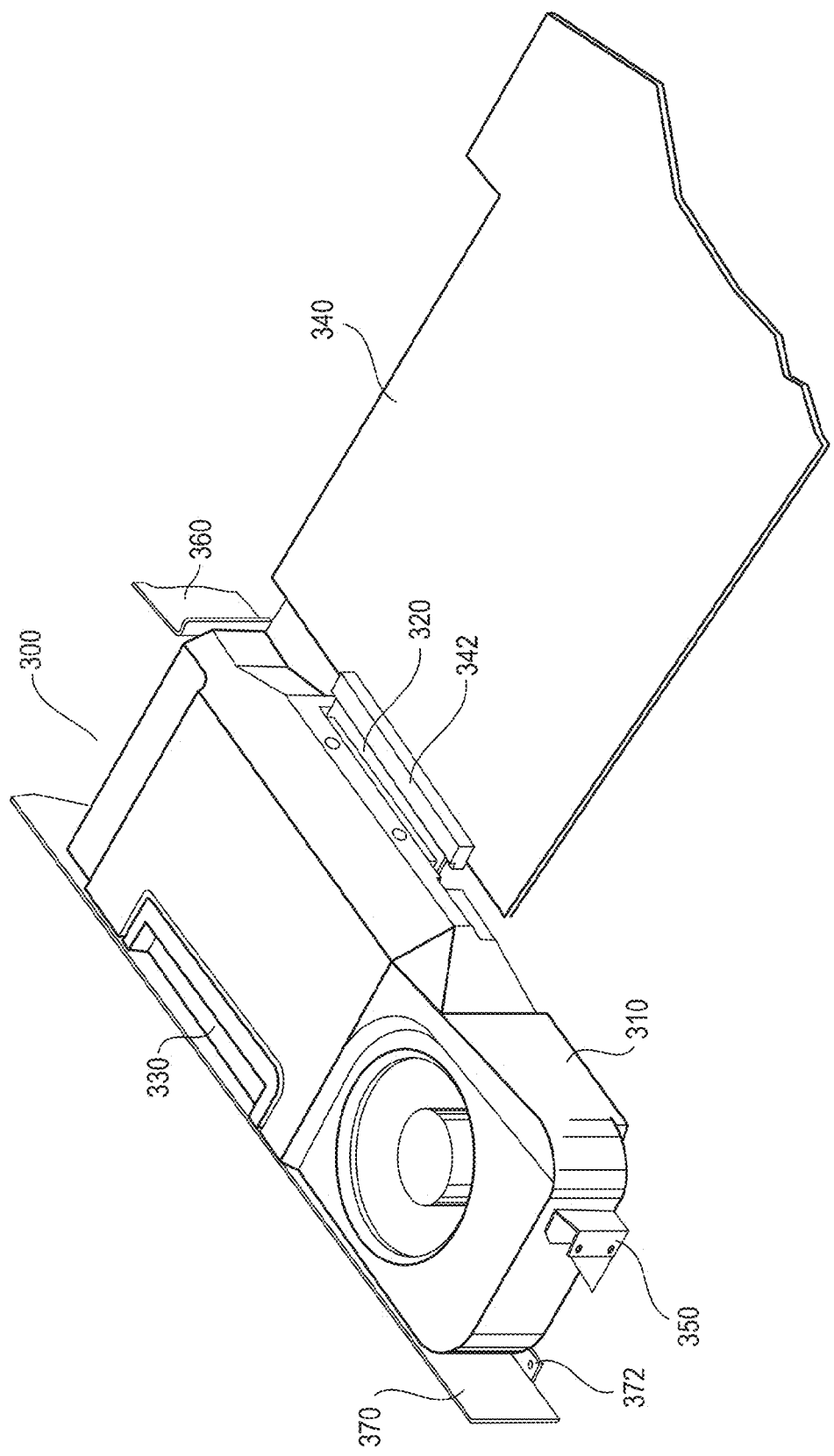

FIGS. 3A and 3B illustrate installation capabilities of a device 300, according to an example. Device 300 may correspond to devices 100 and 200.

Device 300 may include a housing 310 that may house a processor card. A connector 320 of the processor card may extend or protrude from an edge of housing 310. A computer into which device 300 may be installed may include a chassis having a circuit board 340. Circuit board 340 may include a connector 342 configured to connect to connector 320 of the processor card.

Connector 320 may be configured to connect to connector 342 via a hinging motion. Edge 312 of housing 310 may be slanted to allow for easier visibility of connector 312 and connector 342 during installation. To facilitate connection of connector 320 to connector 342, device 300 may be installed into the computer chassis via a hinging motion as well, as illustrated by the arrow in FIG. 3A. The computer chassis may include various components to facilitate installation of device 300. For example, the chassis may include brackets 350, 360, and 370 to guide proper placement and orientation of device 300 during installation. Bracket 370 may additionally include a lip 372 on which device 300 may sit after installation.

Latch 330 of device 300 may latch into a corresponding latch receiver (shown in FIG. 4) on bracket 370. This may be a tool-free operation. After installation, device 300 may be removed by a similar hinging motion. For example, device 300 may be removed by operating latch 330 to release the latch connection with bracket 370 and then lifting device 300 out using an unhinging motion opposite to the hinging motion used to install device 300. In other embodiments, device 300 may be coupled and decoupled to a computer chassis in other ways, such as via different rotating motions, via sliding motions, using different connectors, and the like.

Figure 4:
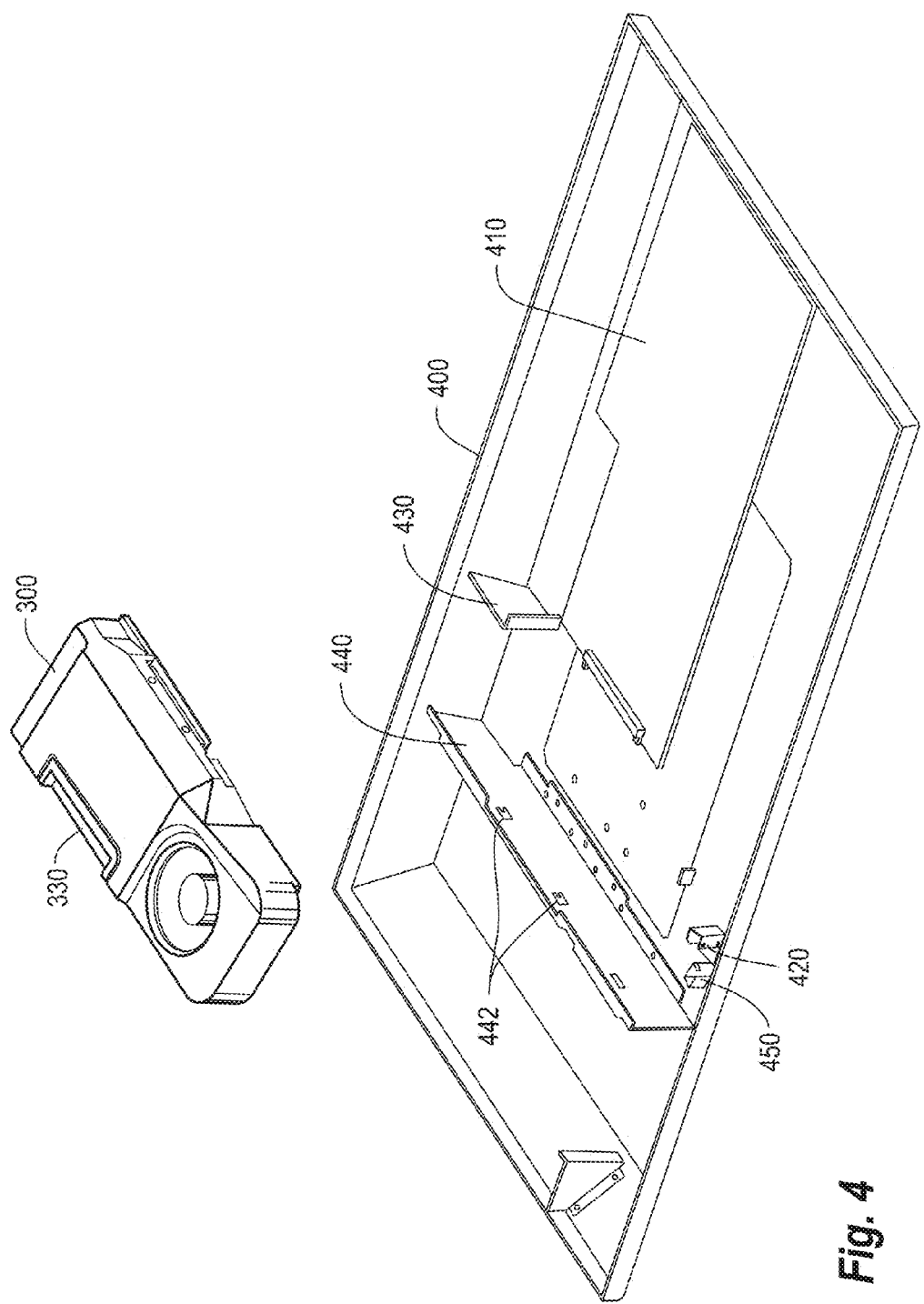
FIG. 4 depicts a chassis configured to receive the device, according to an example.

FIG. 4 illustrates a computer chassis 400 configured to receive device 300, according to an example. Chassis 400 includes a circuit board 410 (corresponding to circuit board 340) and left bracket 420 (corresponding to bracket 350), right bracket 430 (corresponding to bracket 360), and back bracket 440 (corresponding to bracket 370). Latch receivers 442 on back bracket 440 can mate with latch 330 of device 300. Chassis 400 may also include a bracket 450 for facilitating connection of the blind mate connectors of the chassis 400 and the device 300. For example, bracket 450 may include the chassis-side blind mate connector 290. Furthermore, the bracket 450 may fit within cavity 170 of housing 110, as shown in FIG. 1C. When bracket 450 and cavity 170 of the housing are mated upon installation of device 300, the device-side blind mate connector 280 and chassis-side blind mate connector 290 may automatically connect.

Other techniques may be used to install and uninstall device 300. For example, brackets 350-370 may be omitted, and other connectors (or no connectors) other than latch 330 may be used. Although some stability and rigidity of device 300 may be lost in such a case, the stability of device 300 may be improved in other ways, as described below.

FIG. 5 illustrates various attachment features of computer chassis 500, back plate 510, and processor card 520, according to an example. Chassis 500 may correspond to chassis 400, back plate 510 may correspond to back plate 250, and processor card 520 may correspond to processor card 240.

Chassis 500 may include one or more openings 502 to receive one or more pins/posts 512 of back plate 510. Engagement of openings 502 and pins posts 512 can hinder movement of back plate 510 relative to chassis 500. This engagement can automatically happen upon installation of the device into the chassis.

Processor card 520 may also include one or more openings 522 to receive one or more pins/posts 514 of back plate 510. Engagement of openings 522 and pins/posts 514 can hinder movement of processor card 510 relative to back plate 510. This engagement can occur during securing of the back plate to the processor card.

As a result of either or both engagement features, a more secure, stable, and rigid connection may be achieved between the connector of the processor card and a corresponding connector on the circuit board. This more stable connection can avoid deterioration of the connectors that might otherwise naturally occur if the connection was less stable.

What is claimed is:

1. A device, comprising:
a housing;
a heat sink disposed inside the housing and configured to dissipate heat from a processor card;
a fan disposed inside the housing to disperse heat from the heat sink;
a plate to support the fan inside the housing; and
a blind mate connector to automatically connect the fan to a power source of the computer upon installation of the housing into a chassis of a computer, the blind mate connector to connect directly to a corresponding connector on the mother board of the computer through an opening in the plate,
the housing configured to install into the chassis such that an edge of the processor card mates with a connector on a circuit board of the computer.

2. The device of claim 1, wherein the fan is configured to be controlled by the circuit board of the computer via the blind mate connector.

3. The device of claim 1, wherein the housing comprises a latch to connect the housing to the chassis.

4. The device of claim 3, wherein the housing is configured to install into the chassis via a hinging motion.

5. The device of claim 1, further comprising a plate to hold the processor card against the heat sink, wherein the plate comprises a blind mate hook to automatically mate with the chassis of the computer upon installation of the housing into the chassis.

6. The device of claim 5, wherein the processor card is a Mobile PCI Express Module card.

7. The device of claim 6, wherein the plate is configured to hold the Mobile PCI Express Module card against the heat sink via multiple screws.

8. An assembly, comprising:
a housing;
a heat sink disposed inside the housing and configured to dissipate heat from a processor card;
a fan disposed inside the housing to disperse heat from the heat sink; and
a latch to connect the housing directly to a chassis of a computer in a tool-free manner,
the housing configured to install into the chassis such that an edge of the processor card mates with a connector on a circuit board of the computer.

9. The assembly of claim 8, further comprising a blind mate connector to automatically connect the fan to the circuit board of the computer upon installation of the housing into the chassis.

10. A computer, comprising:
a chassis;
a circuit board comprising a graphics card connector; and
a graphics card assembly comprising:
a housing,
a graphics card to connect to the graphics card connector,
a processing unit connected to the graphics card,
a heat sink within the housing and configured to dissipate heat from the processing unit,
a blower within the housing to disperse heat from the heat sink, and
a latch to facilitate tool-free installation of the graphics card assembly into the chassis, wherein the latch is to directly engage the chassis and prevent movement of the graphics card assembly relative to the chassis.

11. The computer of claim 10, wherein the chassis comprises mounting guides and a latch receiver to facilitate installation of the graphics card assembly into the chassis via a hinging motion.

12. The computer of claim 10, wherein the graphics card assembly comprises a first blind mate connector and the chassis comprises a second blind mate connector to enable control of the blower by the circuit board.

13. The computer of claim 10, wherein the graphics card assembly further comprises a back plate to secure the graphics card to the heat sink, the back plate comprising a pin and the graphics card comprising an opening, the pin configured to fit inside the opening to hinder movement of the graphics card relative to the back plate.

14. The computer of claim 10, wherein the graphics card assembly further comprises a back plate to secure the graphics card to the heat sink, the back plate comprising a pin and the chassis comprising an opening, the pin configured to fit inside the opening to hinder movement of the back plate relative to the chassis.

15. The computer of claim 10, wherein the housing has an elongated shape with a first end and a second end, the blower being disposed at the first end and configured to blow air across the heat sink toward the second end.

* * * * *